United States Patent
Di Stefano et al.

(10) Patent No.: US 8,061,490 B2
(45) Date of Patent: Nov. 22, 2011

(54) ELECTROMECHANICAL LINEAR ACTUATOR FOR A PARKING BRAKE

(75) Inventors: Enrico Di Stefano, Rivoli (IT); Andreas Geyer, Vleuten (NL); Emmanuel Eyraud, San Secondo di Pinerolo (IT)

(73) Assignee: Aktiebolaget SKF, Gothenburg (SE)

( * ) Notice: Subject to any disclaimer, the term of this patent is extended or adjusted under 35 U.S.C. 154(b) by 655 days.

(21) Appl. No.: 12/162,525

(22) PCT Filed: Feb. 14, 2007

(86) PCT No.: PCT/EP2007/051418
§ 371 (c)(1),
(2), (4) Date: Jul. 29, 2008

(87) PCT Pub. No.: WO2007/093613
PCT Pub. Date: Aug. 23, 2007

(65) Prior Publication Data
US 2009/0247365 A1    Oct. 1, 2009

(30) Foreign Application Priority Data

Feb. 16, 2006 (IT) .............................. TO2006A0110

(51) Int. Cl.
*B60L 7/00* (2006.01)
(52) U.S. Cl. ....... 188/162; 188/72.8; 188/156; 74/502.4
(58) Field of Classification Search .................. 188/162, 188/2 D, 71.8, 72.8, 71.9, 265, 156, 158, 188/171; 74/501.5 R, 502.4, 89.23, 424.71; 477/197
See application file for complete search history.

(56) References Cited

U.S. PATENT DOCUMENTS

| | | | | |
|---|---|---|---|---|
| 6,609,595 | B2 * | 8/2003 | Flynn et al. ................... | 188/156 |
| 6,840,133 | B2 * | 1/2005 | Aubrey et al. .................. | 74/531 |
| 7,448,475 | B2 * | 11/2008 | Mourad et al. ................ | 188/2 D |
| 2009/0247364 | A1 * | 10/2009 | Sano et al. .................... | 477/197 |

FOREIGN PATENT DOCUMENTS

| DE | 10 2004 006 801 | 8/2004 |
|---|---|---|
| WO | WO 98/56633 | 12/1998 |
| WO | WO 2005/005212 A1 | 1/2005 |
| WO | WO 2005/061293 A1 | 7/2005 |

* cited by examiner

*Primary Examiner* — Pamela Rodriguez
(74) *Attorney, Agent, or Firm* — Merchant & Gould P.C.

(57) ABSTRACT

An actuator includes a screw mechanism (13) having a threaded nut (16) rotatable by an electric motor (11) about a longitudinal axis (x) and a screw (17) translatable along the axis between an axially extended position and an axially retracted position. The screw (17) is connectable to a wire (W) of a Bowden cable (C) having an outer sheath (S). The actuator has a casing (20) with a first, fixed transversal surface (18). A cup (50) is mounted axially slidably on the casing (20) and has a second transversal surface (51) adapted for resting against an end of the sheath (S). A spring (53) is compressed between the first, fixed transversal surface (18) and the sliding cup (50). The cup (50) is capable of reaching an axially extended position, corresponding to a released brake condition, and an axially retracted position towards the first fixed transversal surface (18), against the bias of the spring (53), corresponding to a brake actuated condition.

13 Claims, 5 Drawing Sheets

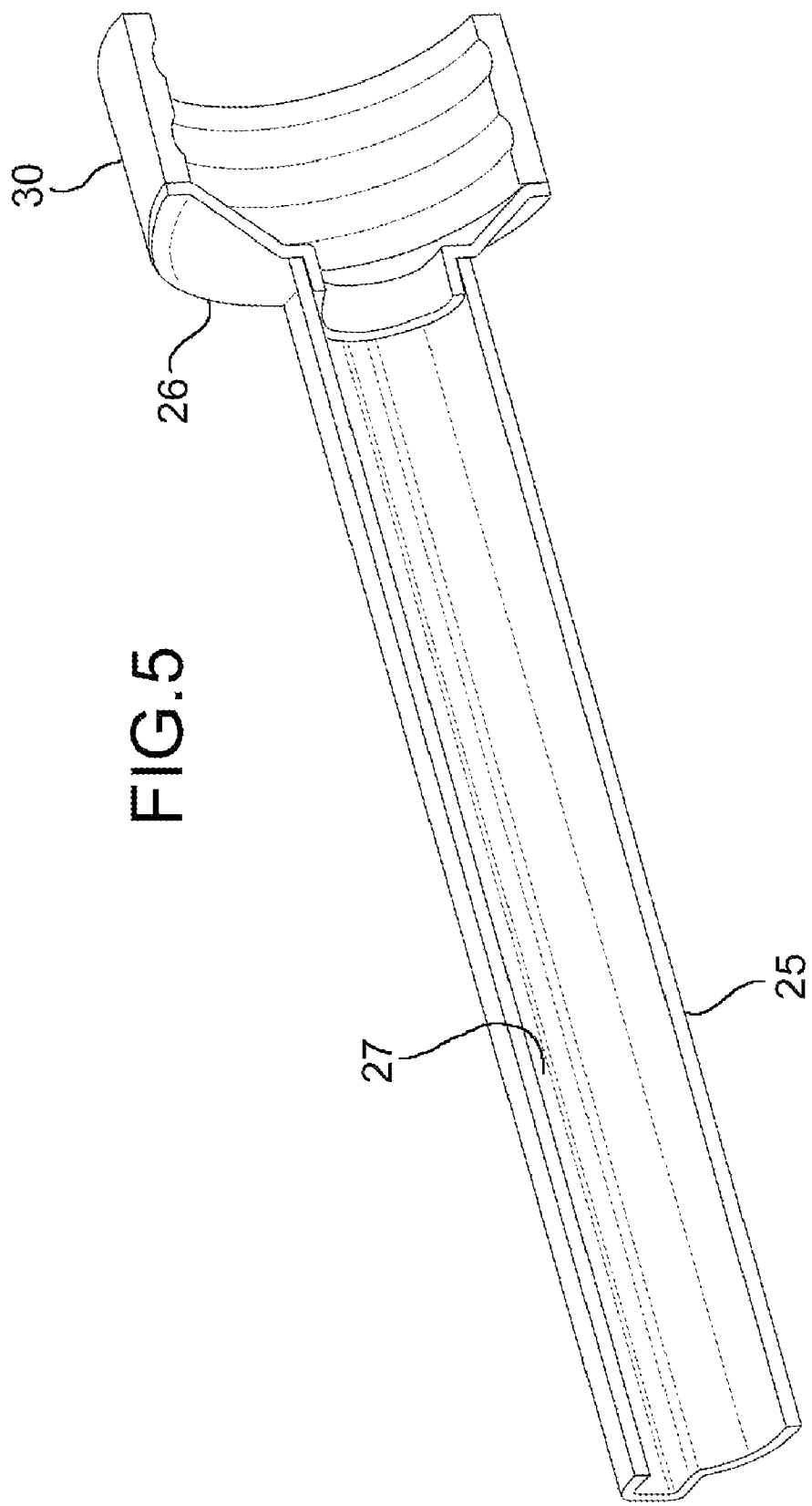

ELECTROMECHANICAL LINEAR ACTUATOR FOR A PARKING BRAKE

This application is a National Stage Application of PCT/EP2007/051418, filed Feb. 14, 2007, which is claims benefit of Serial No. TO2006A000110, filed Feb. 16, 2006 in Italy and which application(s) are incorporated herein by reference. A claim of priority to all, to the extent appropriate is made.

The present invention refers to an electromechanical linear actuator for a parking brake of a motor vehicle.

BACKGROUND OF THE INVENTION

There are known braking devices associated with electromechanical linear actuators comprised of an electric motor and a drive assembly which converts rotary motion imparted to the rotor of the electric motor into a linear movement of an out-put member which applies a braking force to the parking brakes of the vehicle through a Bowden cable. See, for example, WO-A-98/56633 and WO-A-2005/061293. The actuators are associated with sensors that supply signals indicative of the amount of braking force being applied.

SUMMARY OF THE INVENTION

It is a general object of the invention to provide an actuator of simple construction, which allows to obtain accurate and reliable signals about the application of the requested braking force. A particular object of the invention is to attain such signals also in those cases where the actuator is associated with an extremely simplified electronic control system, also in the event of a failure or absence of a sensor of the aforementioned type.

These and other objects and advantages, which will be better understood herein after, are achieved according to the invention by an electromechanical actuator having the features defined in the appended claims.

BRIEF DESCRIPTION OF THE DRAWINGS

The constructional and functional features of a preferred but not limiting embodiment of an actuator according to the invention will now be described, reference being made to the accompanying drawings, in which:

FIG. 5 is a partially sectioned perspective view of some of the components shown in FIG. 2.

DETAILED DESCRIPTION OF THE PREFERRED EMBODIMENT(S)

Figure 1:
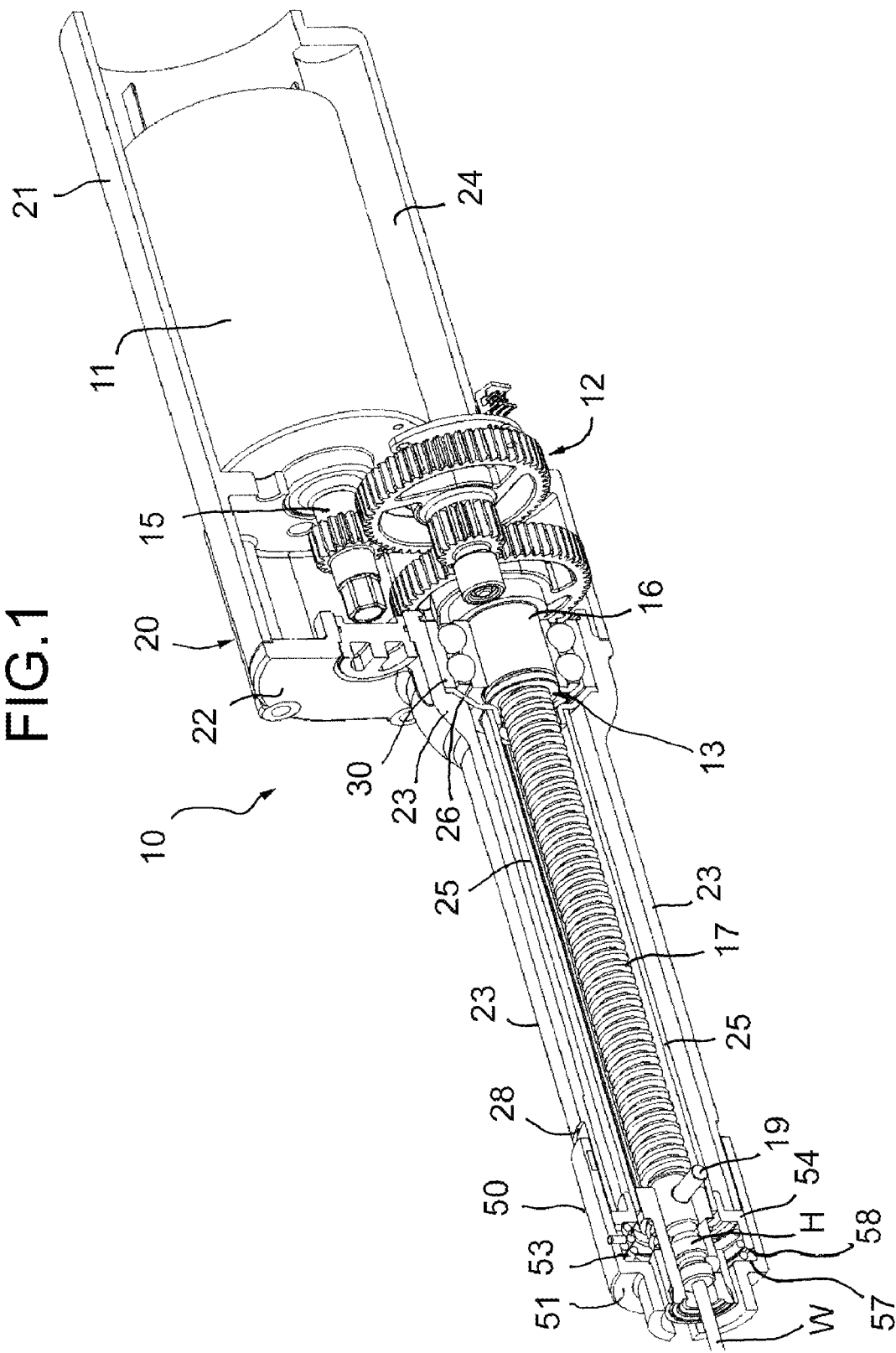
FIG. 1 is a partially sectioned perspective view of an actuator according to the invention.

With reference initially to FIG. 1, numeral 10 indicates overall an electromechanical actuator according to the invention, intended to actuate the parking brakes (not shown) of a motor vehicle. The actuator 10 includes an electric motor 11 which, through a gear reduction assembly 12 and an associated screw mechanism 13, imparts linear movements to a Bowden cable C connected to the parking brakes and comprising a metal wire W and a sheath S.

The electric motor 11 is preferably a permanent magnet direct current motor, which can selectively rotate in either direction depending on a control signal provided by an electronic control module (not shown). An output shaft 15 of the motor drives for rotation, through the reduction assembly 12, a nut 16 of the screw mechanism 13. This screw mechanism can be a friction screw, or a ballscrew, or a roller screw mechanism.

Figure 2:
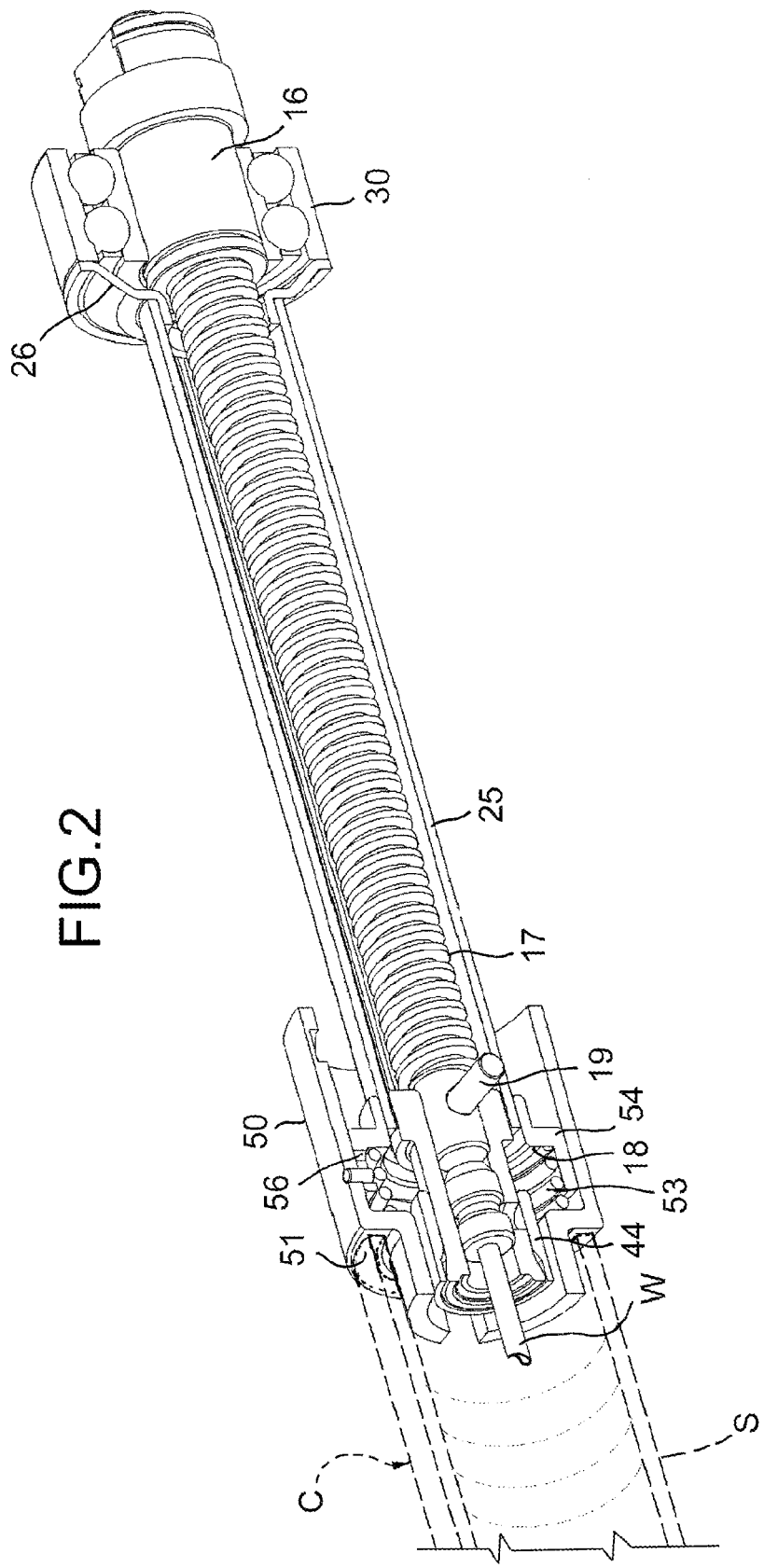
FIG. 2 is an enlarged, partially sectioned perspective view of part of the actuator of FIG. 1.
Figure 3:
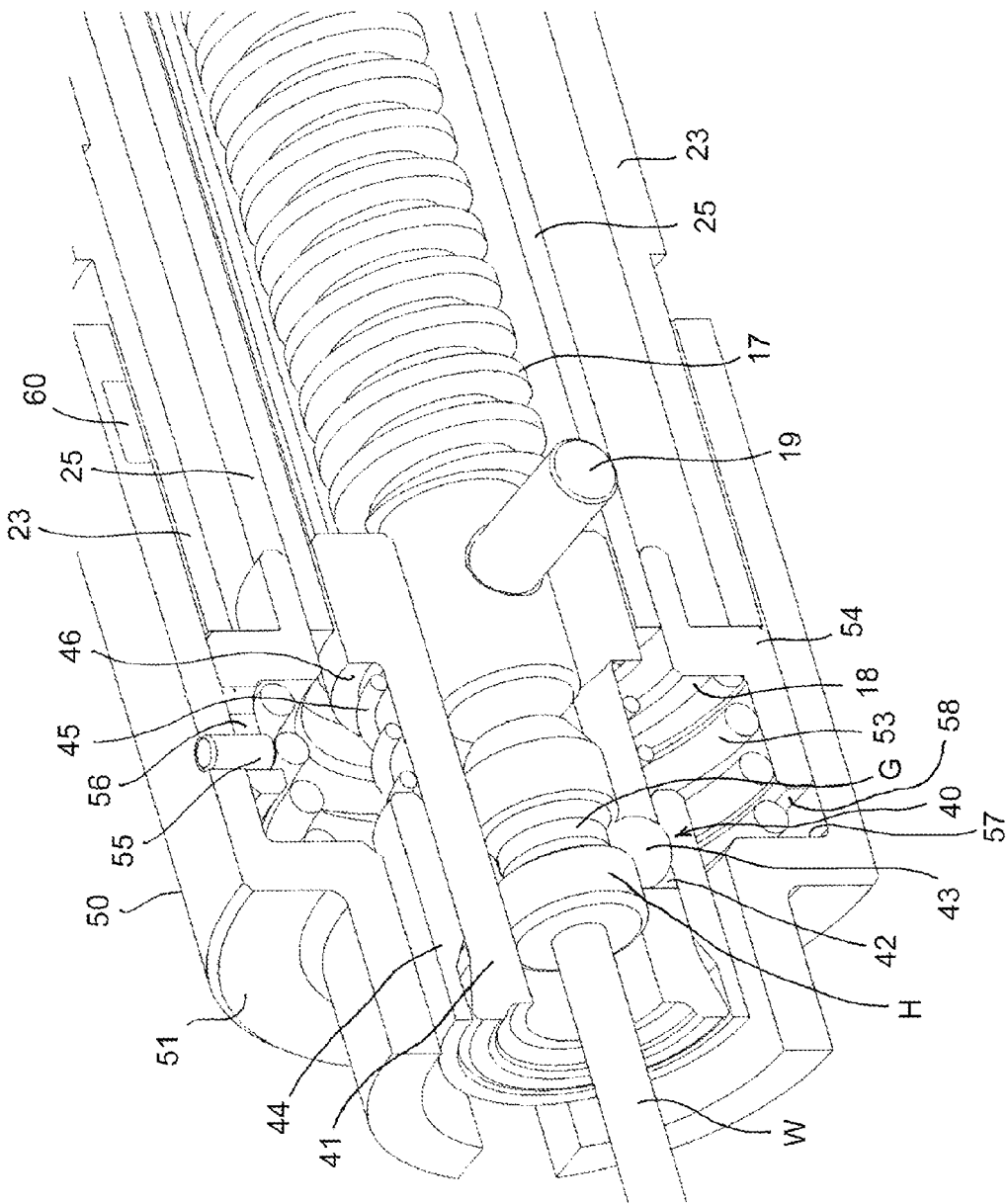
FIG. 3 is a further enlarged, partially sectioned perspective view of part shown in FIG. 2.
Figure 4:
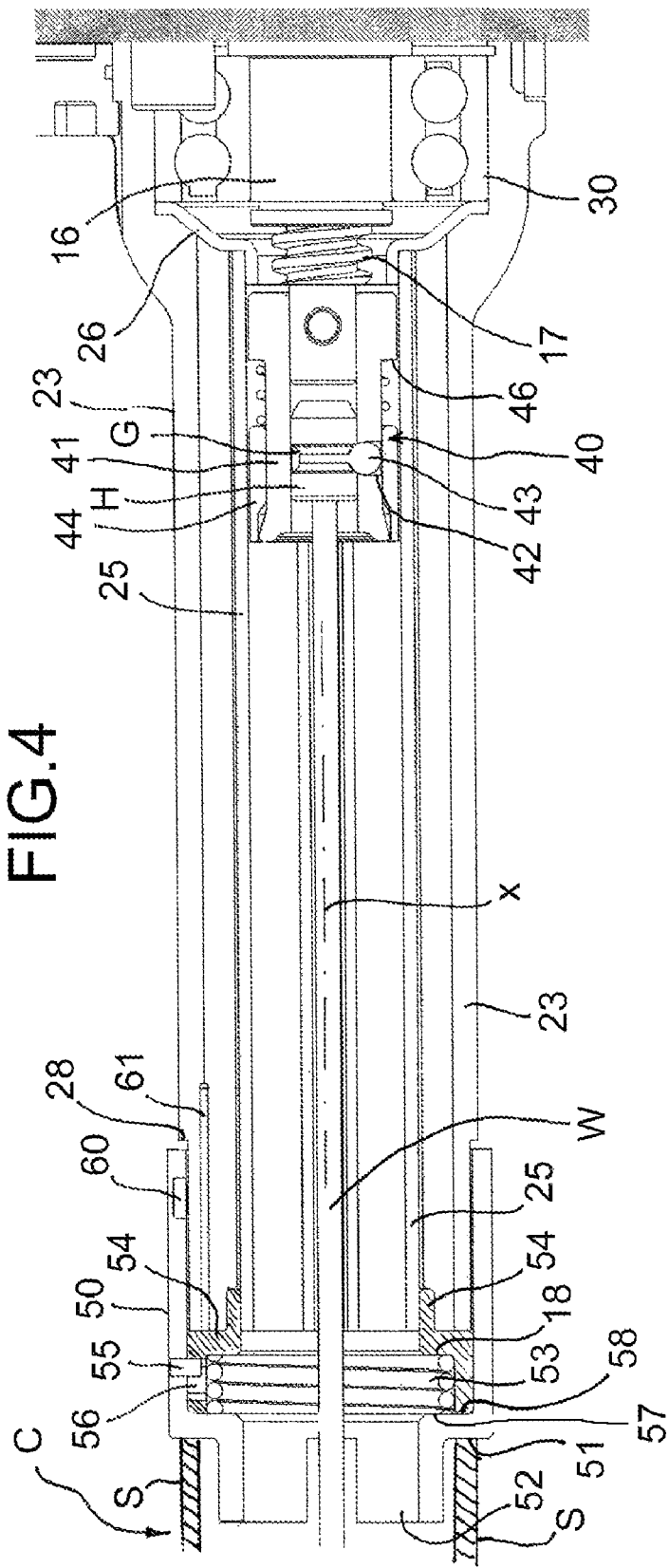
FIG. 4 is an axial cross-sectional view of the part of the actuator shown in FIG. 2.

The screw mechanism converts rotary movement of the nut 16 into linear translating movement of a screw 17 coupled to an end of the metal wire W of Bowden cable C. In FIG. 4, the screw 17 is shown in its axially retracted position that causes tensioning of the wire W and actuates the parking brakes. In FIGS. 1-3, the screw 17 is shown in its axially extended position that causes untensioning of the wire W and releases the brakes.

The actuator 10 has a casing, indicated overall at 20, comprising some parts of plastic material and some parts of metallic material, as explained in the following. The electric motor 11 and the gear reduction assembly 12 are accommodated within a cylindrical casing body 21 of plastic material with a cover 22. The nut 16 is rotatably supported by means of a bearing 30 within a tubular body 23 of plastic material fixed to or formed integral with the cover 22.

As an alternative to the screw mechanism here described, the invention can be equally implemented with a telescopic screw mechanism of the type disclosed in WO-A-2005/005212, wherein the translating output member is coupled to a tubular screw performing a screwing movement about and along a longitudinal axis.

The tubular body 23 extends axially for a length suitable to contain the screw 17 in its fully extended position (FIG. 1). In its axially retracted position (FIG. 4) the screw is contained in a chamber 24 of the casing, alongside the electric motor 11. A metal reinforcing guide tube 25 is coaxially fixed within the plastic tubular body 23, and extends from the free end of the tubular body 23 to the bearing 30, in order to transfer to this the axial loads during operation of the actuator, as discussed hereinafter. In the example shown in the drawings, the guide tube 25 is fixed to a conical member 26 of sheet metal resting against the stationary outer race of the bearing 30. As shown in FIG. 5, the guide tube 25 forms an axially extended rectilinear channel 27. A pin 19 transversally projecting from the axially outer end of the screw 17 slides along the channel 27 to prevent the screw form rotating about its axis of translation.

As used herein, terms and expressions indicating positions and orientations, such as "axial", "radial" and "transversal", should be construed as referring to the axis of translation x of the screw 17. Likewise, such expressions as "axially extended" and "axially retracted" are to be interpreted with respect to the fixed casing 20 of the actuator.

The screw 17 is removably connected to the wire W by means of a locking device 40 (FIG. 3). Fixed onto the axially outer end of the screw is a sleeve 41 with one or more radial through bores 42 in which balls 43 are held engaging a groove G formed in the end head H of wire W. The balls are held in the locking position shown in FIG. 3 by a ring 44 fitted around the sleeve 41 and retained in a locking position around the balls by a spring 45 interposed between a shoulder 46 of the sleeve and the ring 44 itself. In order to connect or disconnect the wire W to or from the screw 17, the ring 44 has to be urged manually, compressing the spring 45 until an inner enlarged part of the ring is brought at the level of the bores 42, whereby the balls 43 move radially outwardly, disengaging the groove G and therefore releasing the head H from the screw 17.

An end of the sheath S of the cable C (FIGS. 2 and 4) rests against a radial or transversal shoulder surface 51 of a cuplike member 50 having an opening 52 for the passage of the wire W. The cup-member 50 is mounted axially slidably with respect to the casing of the actuator, advantageously on the outside of the casing at an easily accessible position. As shown in FIG. 3, the cup member 50 is mounted slidably coaxially on a second cup member 54 having a stepped profile. Cup member 54, which is preferably metallic, is fixed to the axially outer end of the guide tube 25. The first cup member 50 can slide over the free end of the tubular body 23. A compression spring 53 is interposed between the sliding cup 50 and a transversal opposing surface 18 fixed with respect to casing 20. In the example shown in the drawings, the opposing surface 18 is formed by the second, fixed cup 54.

The sliding cup 50 carries a pin 55 projecting in a radially inward direction and sliding in a longitudinal slot 56 of the inner fixed cup 54. The pin 55 acts as a stopping member that holds the sliding cup 50 on the casing when the spring 53 and the sheath S are not axially compressed.

When the screw 17 is in an axially extended position (FIGS. 1-3), which corresponds to the release of the parking brake, the wire W is untensioned and the spring 53 urges the sliding cup 50 away from the actuator casing. When the screw 17 is in an axially retracted position (FIG. 4), that corresponds to actuation of the brake, the wire W is tensioned; the sheath S is axially compressed and urges the sliding cup 50 towards the actuator casing, compressing the spring 53 until the rear transversal surface 57 of the sliding cup 50 abuts against the front transversal surface 58 of the fixed cup 54. It will be noted that the position of the sliding cup 50 with respect to the actuator casing is indicative of the amount of the braking force applied through the Bowden cable.

The sliding cup 50 can carry a permanent magnet 60 generating a magnetic field that can be detected by a fixed linear sensor 61 (FIG. 4), for example a Hall effect sensor, mounted on the tubular body 23 of the casing and electrically connected to the control module of the electric motor. By detecting changes in the intensity of the magnetic field owing to the sliding movements of cup 50 upon tensioning and untensioning the cable, the sensor 61 generates an electric signal that allows to accurately detect the amount of force applied to the brakes by the actuator.

As will be appreciated, this result is attained by means of an actuator of simple design made up of a low number of components, few of which are mobile elements.

Further, it will be appreciated that the abutment between the cups 50 and 54 allows to detect, in an extremely simple manner, that the required actuating force for the brakes has been applied. As a matter of fact, when the wire W is tensioned and the spring 53 is progressively compressed, the current absorbed by the electric motor increases almost proportionally to the degree of compression of the spring. Once the sliding cup 50 has abutted the fixed cup 54, the spring 53 is not further compressed, and the current absorbed by the electric motor 11 increases abruptly. This increase, indicating that the braking force has been applied, can be detected by the electronic control module also in the event of a failure of the sensor 61, or if this sensor is absent, by simply monitoring the current absorbed by the electric motor. Knowing the modulus of spring 53, by means of an algorithm, the value of the braking force applied to the brakes is easily calculated. On the one hand, therefore, the actuator of the present invention is suitable for use with a non sophisticated (and therefore inexpensive) electronic control system; on the other hand, the aforesaid abutment provides the electronic control system with a redundant datum, informing the control system that the braking force has been applied also in the event of a failure of the sensor. It will also be noted that the magnet 60 and the sensor 61, if provided, are located at easily accessible positions for carrying out maintenance or replacement in the event of a failure. Also the spring 53 is easily interchangeable, whereby a same actuator can be promptly adapted to different applications, according to the braking force required by motor vehicle manufacturers.

The casing 20, owing to the metal parts 25, 26 and 54, provides a loop-like path through metal components capable of withstanding high temperatures that may possibly occur within the vehicle in the event of a failure or accident. Indeed, the axial forces pass from the wire W to the screw 17, the nut 16, through the bearing 30, the cone 26, the reinforcing tube 25, the dual diameter cup 54, the spring 53, the sliding cup 50, to return to the sheath S.

The invention is not intended to be limited to the embodiment described and illustrated herein, which should be considered as an example of the actuator; rather, the invention may be modified with regard to the shape and arrangement of parts and to constructional and functional details, as will be apparent to those skilled in the art. For example, in an alternative embodiment, the opposing surface for the sliding cup 50 may consist of a shoulder 28 formed by the tubular body 23. Likewise, the fixed cup 54 may be formed as a single piece with the metal tube 25. In a still different embodiment, the axial stop of the sliding cup 50 can be performed by the same spring 53 in its completely compressed condition, axially interposed between the cup 50 and the fixed surface.

The invention claimed is:

1. An electromechanical linear actuator for a parking brake, comprising:
    an electric motor;
    a screw mechanism having a first threaded element rotatable by the electric motor about a longitudinal axis and a second threaded element translatable along said axis between an axially extended position and an axially retracted position, the second threaded element being connectable to a wire of a Bowden cable having an outer sheath;
    a casing with a first, fixed transversal surface;
    a member mounted axially slidable on the casing and having a second transversal surface adapted for resting against an end of the sheath; and
    elastic means for acting between the first, fixed transversal surface and the sliding member; wherein the sliding member is capable of reaching an axially extended position, corresponding to a released brake condition, and an axially retracted position towards the first fixed transversal surface, against the bias of the elastic means, corresponding to a brake actuated condition.

2. An actuator according to claim 1, wherein the sliding member is slidably mounted on an end of an axially elongated portion of the casing.

3. An actuator according to claim 2, wherein the axially elongated portion of the casing comprises a metal tube.

4. An actuator according to claim 3, wherein the metal tube has opposite ends cooperating in an axial thrust relationship respectively with the first transversal surface and a bearing mounted in the casing for rotatably supporting the first threaded element of the screw mechanism.

5. An actuator according to claim 3, wherein the axially elongated portion of the housing comprises an outer body of plastic material located coaxially outside the metal tube.

6. An actuator according to claim 3, wherein the metal tube forms an axially extended rectilinear guide for axially slidingly engaging a member transversely projecting from the second threaded element.

7. An actuator according to claim 3, wherein the first fixed transversal surface and the further transversal abutment surface are formed by a metal member secured to or integral with the metal tube.

8. An actuator according to claim 1, wherein the sliding element carries a permanent magnet operatively coupled to a sensor or magnetic-electric transducer fixed to the housing and adapted to provide an electric signal indicative of the axial position of the sliding member with respect to the casing.

9. An actuator according to claim 1, wherein the casing has a further fixed transversal surface providing an abutment surface for stopping axial movement of the sliding member in the sliding member's fully retracted axial position.

10. An actuator according to claim 1, wherein the sliding member has substantially the shape of a cup with an opening for allowing the passage of the wire of the Bowden cable.

11. An actuator according to claim 1, wherein the sliding member is located on the outside of the casing.

12. An actuator according to claim 1 wherein the first threaded element is an axially stationary nut rotatably mounted in the casing by a bearing, and wherein the second threaded element is a screw axially translatable with respect to the casing.

13. An actuator according to claim 1, wherein the screw mechanism is a friction screw, or a ballscrew, or a roller screw mechanism.

\* \* \* \* \*